US006612548B2

(12) United States Patent
Landreth et al.

(10) Patent No.: US 6,612,548 B2
(45) Date of Patent: Sep. 2, 2003

(54) HOIST

(76) Inventors: Carvin Theodore Landreth, 415 Ranch Cir., Piedmont, SC (US) 29673; Terry P. Smith, 108 Mullinax Dr., Greenville, SC (US) 29607

( * ) Notice: Subject to any disclaimer, the term of this patent is extended or adjusted under 35 U.S.C. 154(b) by 60 days.

(21) Appl. No.: 09/951,315

(22) Filed: Sep. 11, 2001

(65) Prior Publication Data

US 2003/0047724 A1 Mar. 13, 2003

(51) Int. Cl.[7] .................................................. B60P 1/48
(52) U.S. Cl. ..................................... 254/8 R; 254/8 B
(58) Field of Search ................................ 254/8 B, 124, 254/2 R, 2 B, 8 R, 4 B, 4 R; 269/17, 901

(56) References Cited

U.S. PATENT DOCUMENTS

| | | | |
|---|---|---|---|
| 2,669,424 A | | 2/1954 | Branick |
| 2,909,358 A | | 10/1959 | Southerwick |
| 2,974,809 A | * | 3/1961 | Sellars ................... 212/34 |
| 3,059,785 A | | 10/1962 | Buckeye |
| 3,074,562 A | * | 1/1963 | Clayborne ................. 212/11 |
| 3,794,296 A | | 2/1974 | Hasstedt |
| 4,135,627 A | | 1/1979 | McInerney |
| 4,144,973 A | * | 3/1979 | Reale ..................... 212/8 R |
| 4,190,233 A | | 2/1980 | Godfrey |
| 4,334,668 A | | 6/1982 | Caris |
| 4,421,209 A | * | 12/1983 | Vermette ................... 187/9 R |
| 5,188,247 A | | 2/1993 | Jastrow |
| 5,203,540 A | | 4/1993 | Lee |
| D341,242 S | * | 11/1993 | Thorby ..................... D34/33 |
| 5,261,640 A | | 11/1993 | Yuan |
| 5,261,641 A | | 11/1993 | Ployer |
| 5,375,963 A | | 12/1994 | Wohlwend |
| 5,897,100 A | | 4/1999 | Napier et al. |
| 5,897,101 A | | 4/1999 | Snyder |
| 5,992,824 A | | 11/1999 | Voss |
| 5,076,448 A | * | 12/1999 | Ballard .................... 212/140 |
| 6,164,625 A | | 12/2000 | Shockley et al. |
| 6,170,802 B1 | | 1/2001 | Stovall |

* cited by examiner

Primary Examiner—Joseph J. Hail, III
Assistant Examiner—Daniel Shanley
(74) Attorney, Agent, or Firm—McNair Law Firm, P.A.

(57) ABSTRACT

A crank assembly for use with a hoist assembly comprising an elongated hollow housing with first and second elongated movable elements slidably mounted within opposed ends thereof. Inner ends of the movable elements have a threaded block secured therewith. A crank mechanism is carried within the hollow housing and includes an elongated rod with left hand threads formed along a first section, right hand threads formed along a second section and at least one drive gear mounted on said rod between said left and right hand threads. The threads at opposite ends of the rod are engaged with respective of the block threads connected with the first and second movable elements. A crank handle is connected with said crank mechanism for rotating the drive gear; which causes the crank mechanism to move the movable elements in opposed directions at equal rates. The crank assembly connects with the boom and a support rod of a hoist assembly.

22 Claims, 4 Drawing Sheets

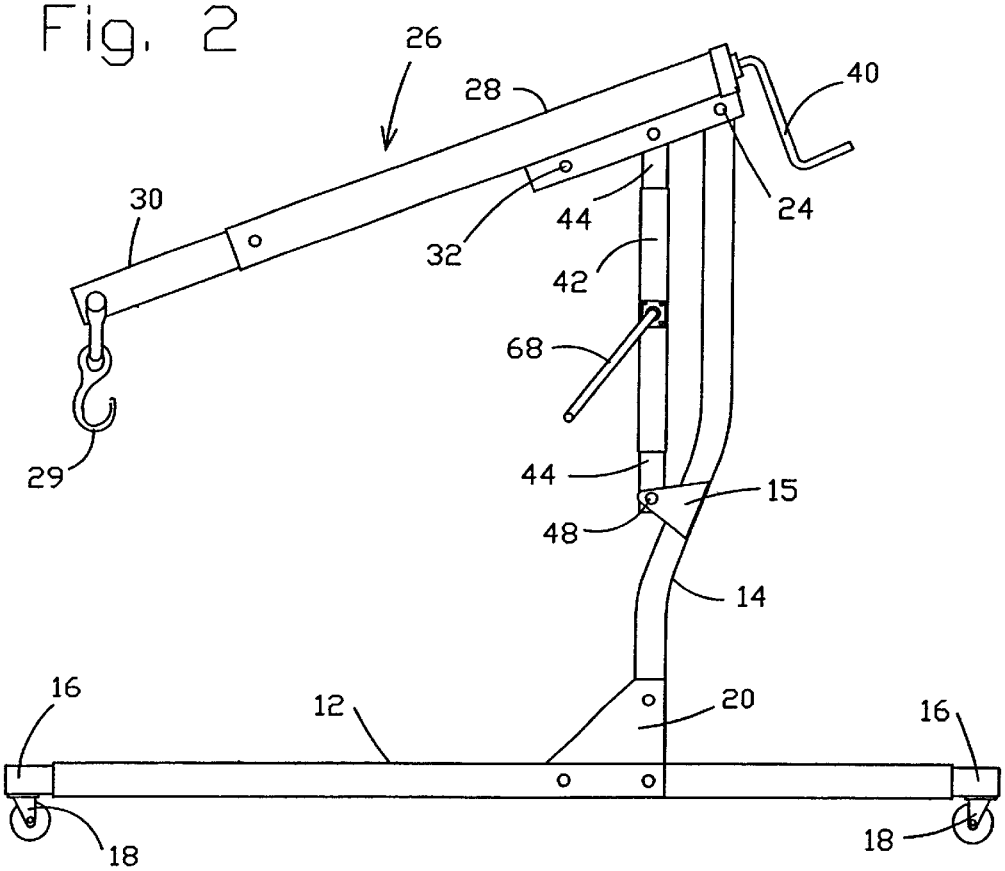
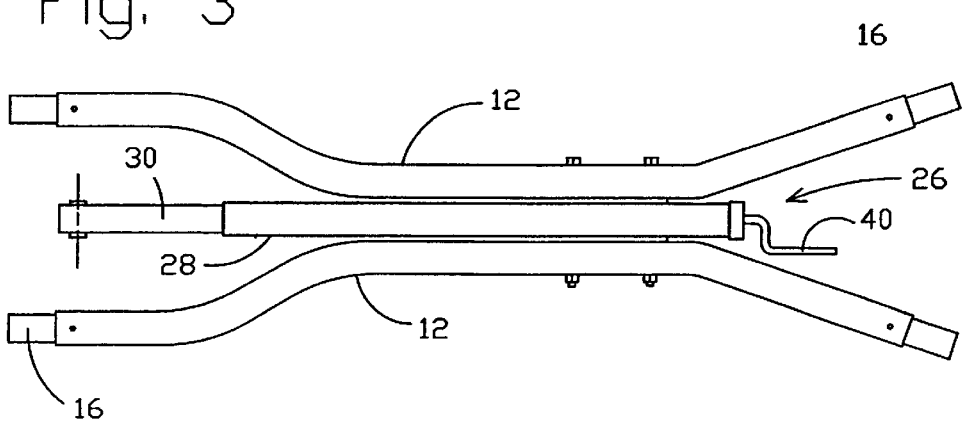

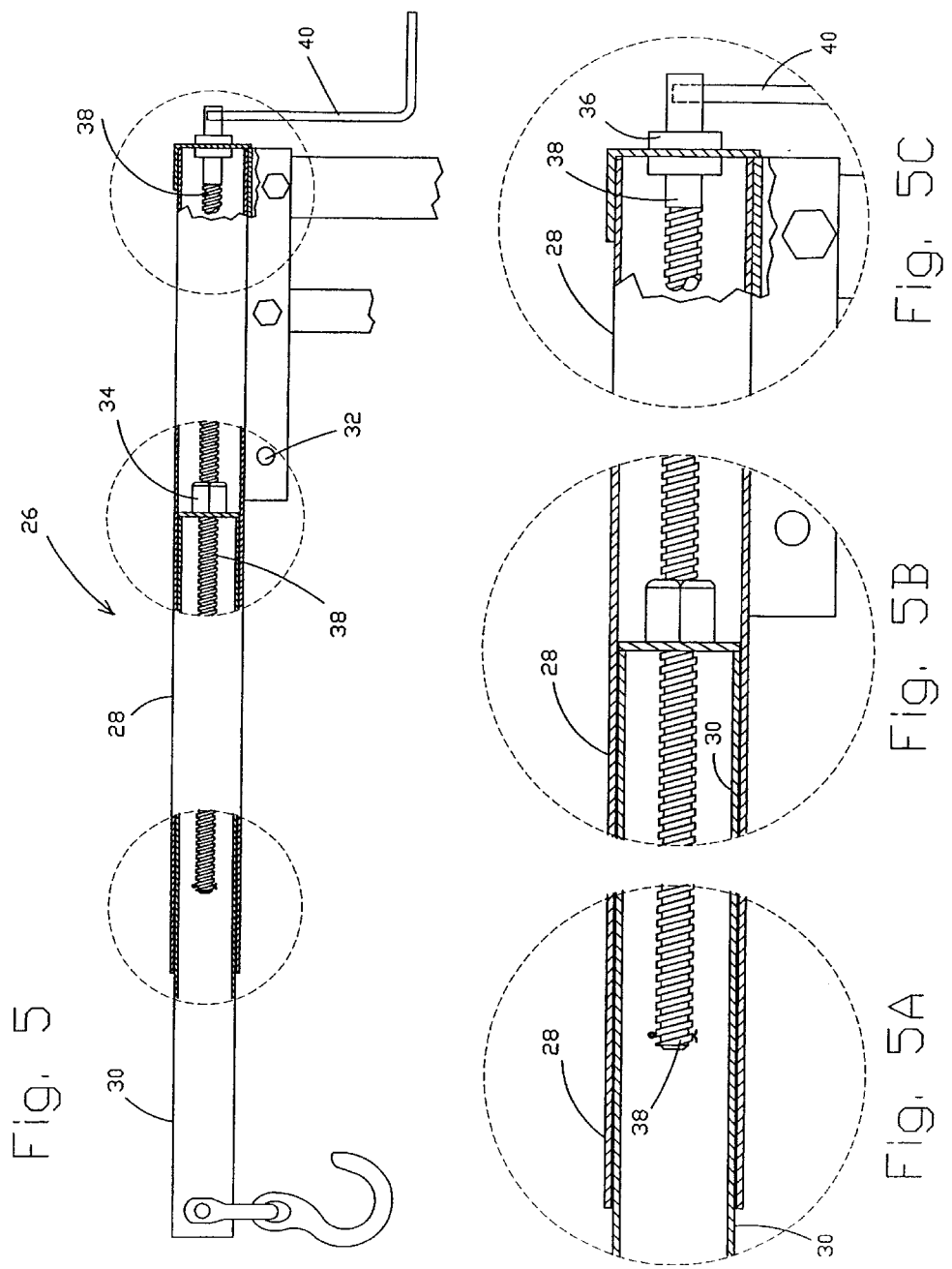

HOIST

BACKGROUND OF THE INVENTION

The instant invention is directed to a hoist assembly for use primarily with automotive machines, such as automobiles, trucks, tractors, etc. for lifting, moving and positioning motors and transmissions during automotive repair or assembly.

Hoist assemblies are well known as is illustrated by U.S. Pat. Nos. 4,144,973; 5,203,540; 5,897,100. Each of these devices include a vertical frame provided for floor movement, a vertical support and a boom. Each also includes a hydraulic drive for raising and lowering the boom.

It has been found that hydraulic drives are not reliable, cannot be controlled to finely adjust the position of the boom and are unsafe due to a tendency to "drop".

The instant invention has as a primary object a hoist assembly in which the boom may be easily and precisely located in a selected vertical position.

Another object of the invention is a hoist assembly in which the boom will remain in its selected position until moved.

Another object of the invention is a hoist assembly in which the boom length is adjustable to precise selected positions.

Another object of the invention is a boom crank assembly for driving and maintaining the boom in selected adjusted positions.

Another object of the invention is a boom crank assembly which moves the boom position at a rapid rate.

Another object of the position is a multi-directional crank assembly for use with a hoist assembly.

SUMMARY OF THE INVENTION

The instant invention is directed to a hoist assembly and a crank assembly utilized therewith. The crank assembly comprises an elongated hollow housing with first and second elongated movable elements slidably mounted within opposed ends thereof. The outer ends of the movable elements carry a mounting assembly while the inner ends of the movable elements have a block secured thereto. Each block has a tap thread formed through its center. A crank mechanism is carried within the hollow housing and includes an elongated rod having a substantially centrally located driving area having left hand threads formed along a first section, right hand threads formed along a second section and at least one drive gear arranged between the threads. The left and right hand threads are engaged with the respective block tap threads of the first and second movable elements. A hand driven crank handle is connected with the crank mechanism for rotating the drive gear which causes the crank mechanism to move the movable elements in opposed directions at equal rates.

The crank mechanism includes a crank arm carried in a bearing which is secured with the housing and a gear which engages with the drive gear. A cradle is secured with an inner wall of the housing and includes at least one bearing adjacent the drive gear which supports the rod for rotation. The cradle is secured with an inner surface of the housing.

The hoist assembly includes a base, a vertical arm carried by the base, and a generally horizontally extending boom pivotally carried adjacent one end by the upper end of the vertical arm. The boom includes a boom extension arm extending from its opposite end.

A crank assembly, having opposed movable elements respectively connected to one of the boom and the vertical arm, is provided. The crank assembly is adapted to move the boom along a vertical plane and about the pivotal mount.

The boom comprises an elongated hollow housing in which the boom extension is reciprocally mounted. The boom crank mechanism is operative to selectively position the boom extension longitudinally of the boom. The boom crank mechanism includes a crank arm extending from one end of the boom.

There are a plurality of connections longitudinally of the boom for connecting a movable element with the boom.

The base of the boom assembly includes a brace for stabilizing the vertical arm in a vertical position. The base includes a plurality of horizontal arms extending radially from the vertical arm. Each of the horizontal arms mounts a rotatable caster at its end remote the vertical arm allowing multi-directional movement of the assembly. Also, the horizontal arms are longitudinally adjustable providing addition stability when required.

Preferably the base, the vertical arm, the housing, the boom and boom extension are formed of rectangular hollow tubing.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 2 is a side view of the hoist assembly;

FIG. 3 is a top view of the hoist assembly;

FIG. 5 is a cutaway side view of the boom;

FIG. 5A is an exploded sectional view of an end portion of the boom;

FIG. 5B is an exploded mid-portion of the boom of FIG. 5; and

FIG. 5C is an exploded opposite end portion of the boom of FIG. 5.

DESCRIPTION OF A PREFERRED EMBODIMENT

Figure 1:
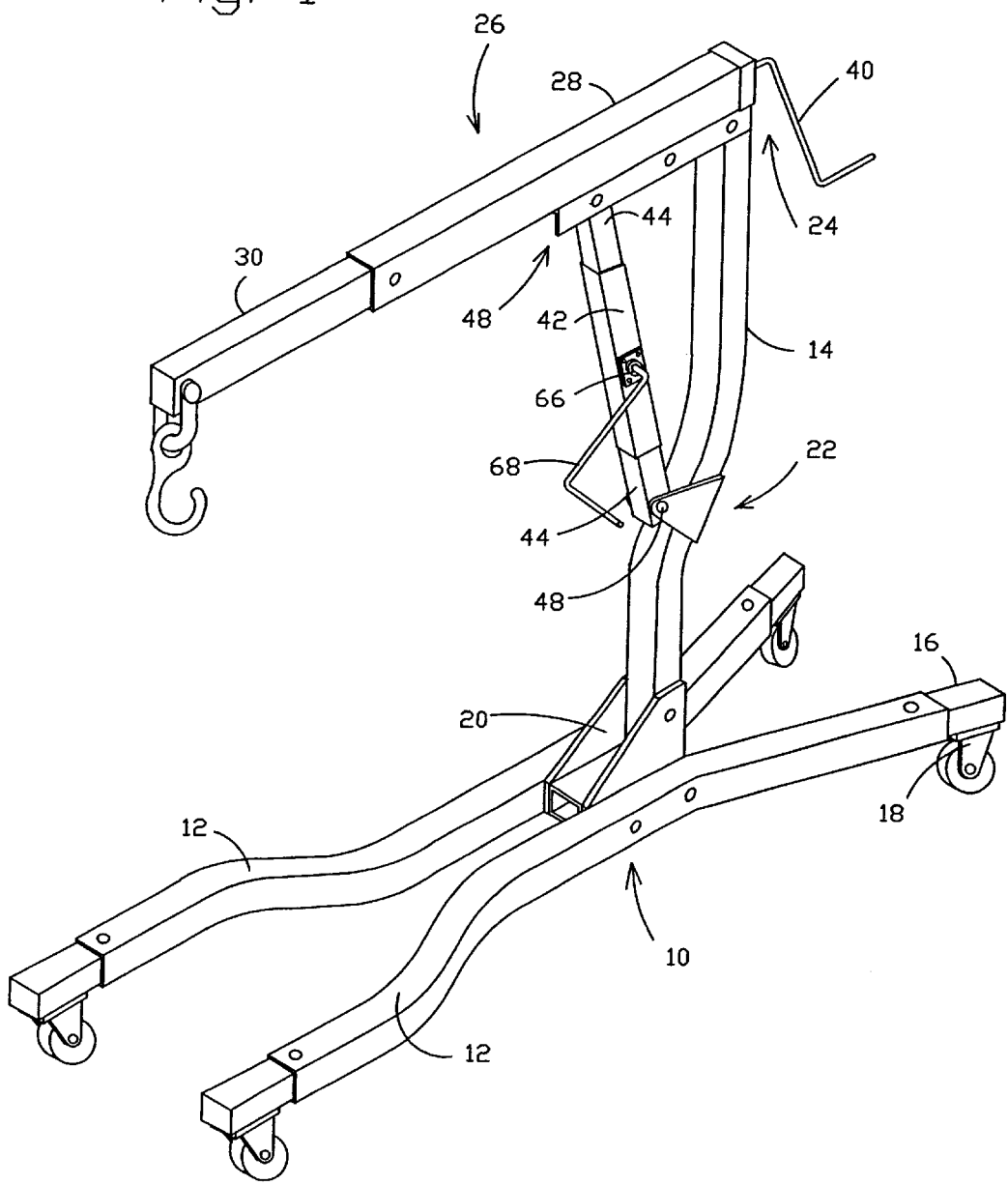
FIG. 1 is a perspective view of the hoist assembly of the invention.

Referring now to the drawings, the invention will now be described in more detail.

The hoist assembly of the invention is shown at 10 in FIG. 1. The hoist assembly includes a base formed of horizontal arms 12 extending radially from vertical arm 14. Each horizontal arm mounts at its end an extension 16 which mounts a caster 18. By moving the extensions axially of arms 12 the circumference of the base may be enlarged or reduced as desired. The casters, which rotate through 360' provide multi-directional movement for the hoist assembly.

Brace 20 is secured with horizontal arms 12 along the longitudinal axis thereof and with vertical arm 14 providing additional support against movement of the vertical arm in the direction of boom 26.

Vertical arm 14 is formed with a slight bend 22 at approximately its mid-point and a pivot 24 is formed at its upper end. Pivot 24 mounts with boom 26 while bend 22 mounts with crank assembly 40 by way of plate 15. Plate 15 may be mounted with vertical arm 14 for vertical adjustment.

Boom 26, includes a base section 28 and an extension 30. The boom includes a plurality of mounting holes 32 arranged adjacent one end and longitudinally thereof with the outer most hole forming a portion of pivot 24 with the upper end of vertical arm 14.

Extension 30 is sized to fit within the interior of base section 28 to extend from a first end thereof. The inner end of extension 30 is closed and carries a threaded block 34. The pivoted end of base section 28 is also closed and carries bearing 36. Rod 38 is carried by bearing 36 and block 34. Rod 38, along substantially its entire length, is formed with a 2" tap thread which mates with the thread formed in block 34. The opposite end or the end of rod 38 carried by bearing 34 is not threaded and carries a crank handle 40.

Rotation of crank handle 40 moves extension 30 within base section 26 in a positive manner allowing the end portion of boom 26 to be precisely adjusted.

This adjustment may be made under load to a desired length. Threaded rod 38 and block 34 also act to lock extension 30 in the selected position.

Hook 29 or some other suitable connecting member is affixed to the end of extension 30.

Figures 4, 4A:
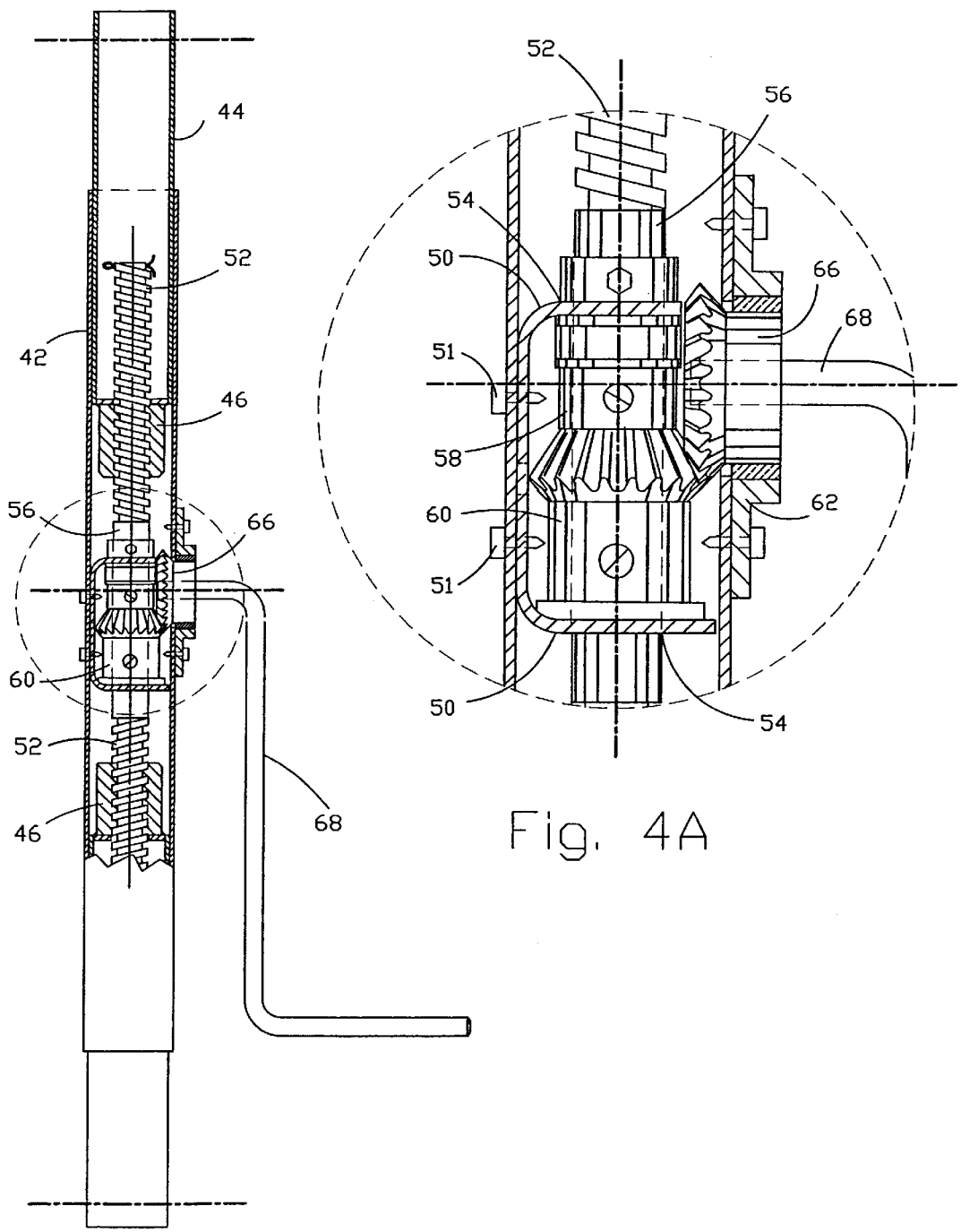
FIG. 4 is a cutaway side sectional view of the crank assembly.
FIG. 4A is an exploded view of the crank mechanism of the crank assembly.

The crank assembly 40 of hoist 10 is best shown in FIGS. 4 and 4A. The crank assembly includes an elongate housing 42 which consists of an elongated hollow tube which carries at each end an elongate element 44 sized to slidably fit inside housing 42. Each element 44 carries, fixed to its inner end, block 46 which includes a threaded core. The opposite end of each element 44 is formed with a mounting member, such as hole 48, for mounting with one of boom 26 or vertical arm 14.

Housing 42 carries at substantially its mid-point and in its interior a cradle 50 which is secured in position by bolts 51 which pass through both the housing and the cradle.

Rod 52 passes through blocks 46 and cradle 50. A first end portion of rod 52 is formed with a left hand 2" taper thread while a second and opposite end portion of rod 50 is formed with a right hand 2" taper thread. The threaded core of each block 46 is formed with a matching thread.

The center portion of rod 52 is carried by spaced bearings 54 formed in cradle 50. Collar 56 secures with rod 52 adjacent an outer side of cradle 50 while collar 58 secures with rod 52 inside cradle 50. Adjacent collar 56 and inside cradle 58 a bevel gear 60 is also secured with rod 52. Collars 56 and 58 along with bevel gear 60 maintain shaft 52 in a fixed position longitudinally of its axis.

A second collar 62 is secured with the outer side of housing 42 adjacent cradle 50. A second bevel gear 64 is carried by bearing 64 in collar 62 and meshes with bevel gear 60. Crank 68 connects with bevel gear 66.

It is preferred that the hoist assembly be formed of square, triangular or rectangular steel tubing. For example, it is preferred that horizontal arms 12 be 3" square tubing and that extensions 16 be 2.5" square tubing. It is preferred that rectangular steel tubing be used to form boom 26 and vertical arm 22. For the boom, base section 28 is preferably 3"×4" rectangular tubing and extension 30 is preferably 2.5"×3.5" rectangular tubing. For vertical arm 14 it is preferred that 2.75"×3.5" tubing be used. These sizes and shapes are optional and other sizes and shapes could be employed.

In practice, the hoist assembly is pushed into position adjacent the objet to be lifted, i.e. a motor. With the assembly located adjacent the vehicle, boom 26 is lowered by rotating crank 68 which in turn rotates shaft 52 causing elements 44 to be driven in opposite directions at equal speeds. Extension 30 is moved by crank 40 to accurately locate the end of boom 26 over the object to be lifted. At this point suitable strapping connects the object with hook 29. Crank assembly is actuated to raise boom 26 and lift the object to a desired position.

Because the drive is mechanical with a pitch selected in the range indicated for the threaded shafts, the end of boom 26 maintains the selected stationary position under load or load free. The mechanical drive allows for precise adjustment of the boom end under load without fear of drop or uncontrolled movement. Hydraulic drives will not provide such controlled and precise positioning.

The selected pitch of the thread enables the user to lift extremely heavy loads without significant resistance against the crank handle while the multi-direction threads provide a rapid pace motion.

While a preferred embodiment of the invention has been described using specific terms, such description is for illustrative purposes only, and it is to be understood that changes and variations may be made without departing from the spirit or scope of the following claims.

What is claimed is:

1. A crank assembly for use with a hoist assembly comprising:

an elongated hollow housing;

first and second elongated movable elements slidably mounted within opposed ends of said elongated housing;

inner ends of said first and second movable elements having a block secured therewith, each said block having a tap thread formed therein;

a crank mechanism carried within said hollow housing, said crank mechanism including an elongated rod having a substantially centrally located driving area including left hand threads formed along a first section, right hand threads formed along a second section and at least one drive gear mounted on said rod between said left and right hand threads with respective of said left and right hand threads being engaged with respective of said block tap threads of said first and second movable elements;

a crank handle connected with said crank mechanism for rotating said drive gear; whereby rotation of said crank handle causes said crank mechanism to move said first and second movable elements in opposed directions at equal rates.

2. The crank assembly of claim 1 wherein: said movable elements include a mounting assembly on outer ends thereof.

3. The crank assembly of claim 1 wherein: said crank mechanism includes a crank arm carried in a bearing secured with said housing and a gear engaging said drive gear.

4. The crank assembly of claim 1 including: a cradle secured with an inner wall of said housing, said cradle having at least one bearing adjacent said drive gear supporting said rod for rotation.

5. The crank assembly of claim 4 wherein: said cradle is secured with an inner surface of said housing.

6. The crank assembly of claim 1 wherein: said crank mechanism is driven by hand.

7. The crank assembly of claim 1 wherein: said housing is rectangular.

8. A hoist for lifting comprising:

a base;

vertical arm carried by said base;

a generally horizontally extending boom pivotably carried adjacent one end by an upper end of said vertical arm, said boom having a boom extension extending from a second end thereof;

a crank assembly including a housing carrying a first movable element at one end and a second movable element at a second end, said movable elements being driven in opposing directions longitudinally of said housing, said movable elements being connected to one of said boom and said vertical arm mounting said housing between said boom and said vertical arm; whereby, actuation of said crank assembly moves said elements in opposed directions moving said boom about said pivot in an upward and downward direction along a vertical plane.

9. The hoist of claim 8 wherein; said boom comprises an elongated hollow housing in which said boom extension is reciprocally mounted.

10. The hoist of claim 9 including; a boom crank mechanism carried within said boom and said boom extension, said boom crank mechanism being operative to selectively position said boom extension longitudinally of said boom.

11. The hoist of claim 10 including; a crank arm extending from an end of said boom, said crank arm being connected with said boom crank mechanism.

12. The hoist of claim 8 wherein; said connection between said crank assembly and said vertical arm includes a plurality of vertical positions.

13. The boom of claim 8 wherein; said base includes a brace for stabilizing said vertical arm vertically.

14. The hoist of claim 8 wherein; said base includes a plurality of horizontal arms extending radially from said vertical arm.

15. The hoist of claim 14 wherein; each of said horizontal arms mounts a rotatable caster at its end remote said vertical arm.

16. The hoist of claim 13 wherein; said horizontal arms are longitudinally adjustable.

17. The hoist of claim 8 wherein; said vertical arm, said boom and said base are formed of rectangular tubing.

18. The hoist of claim 8 wherein: said movable elements include a mounting assembly on outer ends thereof.

19. The hoist of claim 8 wherein said crank assembly includes a crank arm carried in a bearing secured with said housing and drive gears carried by said rod and said crank arm.

20. The hoist of claim 8 wherein said crank assembly includes a cradle secured with an inner wall of said housing, said cradle having at least one bearing supporting a drive gear mounted on said rod for rotation.

21. The hoist of claim 20 wherein: said cradle is secured with an inner surface of said housing.

22. A hoist for lifting comprising:

a base;

a vertical arm carried by said base;

a generally horizontally extending boom pivotably carried adjacent one end by an upper end of said vertical arm, said boom having a boom extension extending from a second end thereof;

a crank assembly including an elongate hollow housing;

first and second elongate movably elements slidably mounted within opposite ends of said elongate housing;

outer ends of said first and second movably elements being connected with one of said vertical arm and said boom;

a crank mechanism carried within said hollow housing, said crank mechanism including an elongated rod having a substantially centrally located driving area including left hand threads formed along a first section, right hand threads formed along a second section and at least one drive gear mounted on said rod between said left and right hand threads, respective of said left and right hand threads being engaged with respective of said block tap threads of said first and second movable elements; whereby actuation of said crank assembly moves said movable elements in opposed directions moving said boom about said pivot in an upward and downward direction along a vertical plane.

* * * * *